US008930351B1

(12) United States Patent
Kim et al.

(10) Patent No.: US 8,930,351 B1
(45) Date of Patent: Jan. 6, 2015

(54) GROUPING OF USERS

(75) Inventors: Hyung-Jin Kim, Sunnyvale, CA (US);
Yair Kurzion, Mountain View, CA (US);
Philip McDonnell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 12/751,359

(22) Filed: Mar. 31, 2010

(51) Int. Cl.
*G06F 7/00* (2006.01)
*G06F 17/30* (2006.01)

(52) U.S. Cl.
USPC ........................................................ 707/723

(58) Field of Classification Search
USPC ........................................................ 707/723
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1* | 1/2001 | Culliss | 707/721 |
| 6,539,377 B1* | 3/2003 | Culliss | 1/1 |
| 6,816,850 B2* | 11/2004 | Culliss | 707/711 |
| 7,031,961 B2* | 4/2006 | Pitkow et al. | 1/1 |
| 2003/0187837 A1* | 10/2003 | Culliss | 707/3 |
| 2004/0049494 A1* | 3/2004 | Kottisa | 707/3 |
| 2006/0161520 A1* | 7/2006 | Brewer et al. | 707/3 |
| 2006/0212817 A1* | 9/2006 | Paek et al. | 715/745 |
| 2007/0118515 A1* | 5/2007 | Dehlinger | 707/3 |
| 2007/0233671 A1* | 10/2007 | Oztekin et al. | 707/5 |
| 2007/0239680 A1* | 10/2007 | Oztekin et al. | 707/3 |
| 2007/0260598 A1* | 11/2007 | Odom | 707/5 |
| 2008/0071772 A1* | 3/2008 | Rosenoff et al. | 707/5 |
| 2009/0077033 A1* | 3/2009 | McGary et al. | 707/3 |
| 2009/0248682 A1* | 10/2009 | Hueter et al. | 707/5 |
| 2010/0070554 A1* | 3/2010 | Richardson et al. | 709/202 |
| 2010/0257169 A1* | 10/2010 | Kim et al. | 707/737 |

OTHER PUBLICATIONS

Joachims, "Evaluating Search Engines Using Clickthrough Data", Cornell University, Department of Computer Science, Draft, Feb. 19, 2002, 13 pages.
Joachims; Optimizing search engines using clickthrough data; 2002; Proceedings of the ACM SIGKDD International Conference on Knowledge Discovery and Data Mining, p. 133-142, 10 pages.

(Continued)

*Primary Examiner* — Robert Beausoliel, Jr.
*Assistant Examiner* — Michael Pham
(74) *Attorney, Agent, or Firm* — Fish & Richardson P.C.

(57) ABSTRACT

Methods, systems, and apparatus, including computer programs encoded on a computer storage medium, for grouping of users. In one aspect, a method includes selecting a current user group for a search session based on search results selected by a user during the search session. The method also includes obtaining a plurality of search results responsive to a query submitted by the user during the search session wherein each of the search results has a respective score. The method also includes determining that a search result in the plurality of search results is one in which users associated with the current user group select as a selected search result a percentage of time more often or less often than a general population of users that is larger than a number of users associated with the current user group. The method also includes in response to determining, modifying an order of the plurality of search results by modifying the respective score of the search result based on the percentage. The method also includes providing the modified plurality of search results in response to the query.

18 Claims, 11 Drawing Sheets

(56) References Cited

OTHER PUBLICATIONS

Jansen et al., "An Analysis of Web Documents Retrieved and Viewed", School of Information Sciences and Technology, The Pennsylvania State University, the 4$^{th}$ International Conference on Internet Computing, Las Vegas, Nevada, pp. 65-69, Jun. 23-26, 2003, 5 pages.

* cited by examiner

GROUPING OF USERS

BACKGROUND

This specification relates to using system interactions of one or multiple users to identify the features of the user or users.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance may be premised on the assumption that, if authors of web pages felt that another web site was relevant enough to be linked to, then web searchers would also find the site to be particularly relevant. In short, the web authors "vote up" the relevance of the sites.

SUMMARY

In general, one aspect of the subject matter described in this specification can be embodied in methods that include the actions of selecting a current user group for a search session based on search results selected by a user during the search session; obtaining a plurality of search results responsive to a query submitted by the user during the search session wherein each of the search results has a respective score; determining that a search result in the plurality of search results is one in which users associated with the current user group select as a selected search result a percentage of time more often or less often than a general population of users that is larger than a number of users associated with the current user group; in response to determining, modifying an order of the plurality of search results by modifying the respective score of the search result based on the percentage; and providing the modified plurality of search results in response to the query.

In general, another aspect of the subject matter described in this specification can be embodied in methods that include the actions of selecting a current user group for a search session based a first query submitted during the search session; obtaining a plurality of search results responsive to a second query submitted by the user during the search session wherein each of the search results has a respective score; determining that a search result in the plurality of search results is one in which users associated with the current user group select as a selected search result a percentage of time more often or less often than a general population of users that is larger than a number of users associated with the current user group; in response to determining, modifying an order of the plurality of search results by modifying the respective score of the search result based on the percentage; and providing the modified plurality of search results in response to the query.

These and other embodiments can optionally include one or more of the following features. The current user group may represent a plurality of websites. Each website in the plurality of websites may be substantially as likely to be visited in a same session as another website in the plurality for a plurality of users. Selecting the current user group may include determining that a number of the selected search results are from websites in the current user group. The user session may be defined by one or more of: a period of time, a number of submitted queries, and by a period of time between successive submitted queries. The current user group may represent a demographic characteristic of the current user. At least one of the search results selected by the user may be associated with a probability that the search session is associated with the user group. Selecting the current user group may include associating the probability with the search session. Selecting a current user group may include identifying terms in the first query indicative of membership of the group. Identifying terms in the first query indicative of membership of the group may include identifying a spelling convention. Identifying terms in the first query indicative of membership of the group may include identifying term indicative a profession. Selecting a current user group may include identifying that the first query is misspelled.

Particular embodiments of the subject matter described in this specification can be implemented so as to realize one or more of the following advantages. Search results that better meet the needs of the user may be produced. Users may be grouped together with other users who share similar interests. Items of interest may be presented to the user once the user is identified. Advertisements targeting the user's areas of interest may be sent to the user. Spelling may be corrected based on the user's area of interest. For example, for a using interested in sailing "bot" is probably a misspelling of "boat"; however, for a user interesting in robotics "bot" is probably not misspelled. Users may be grouped with other users who share similar interests for social searching.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
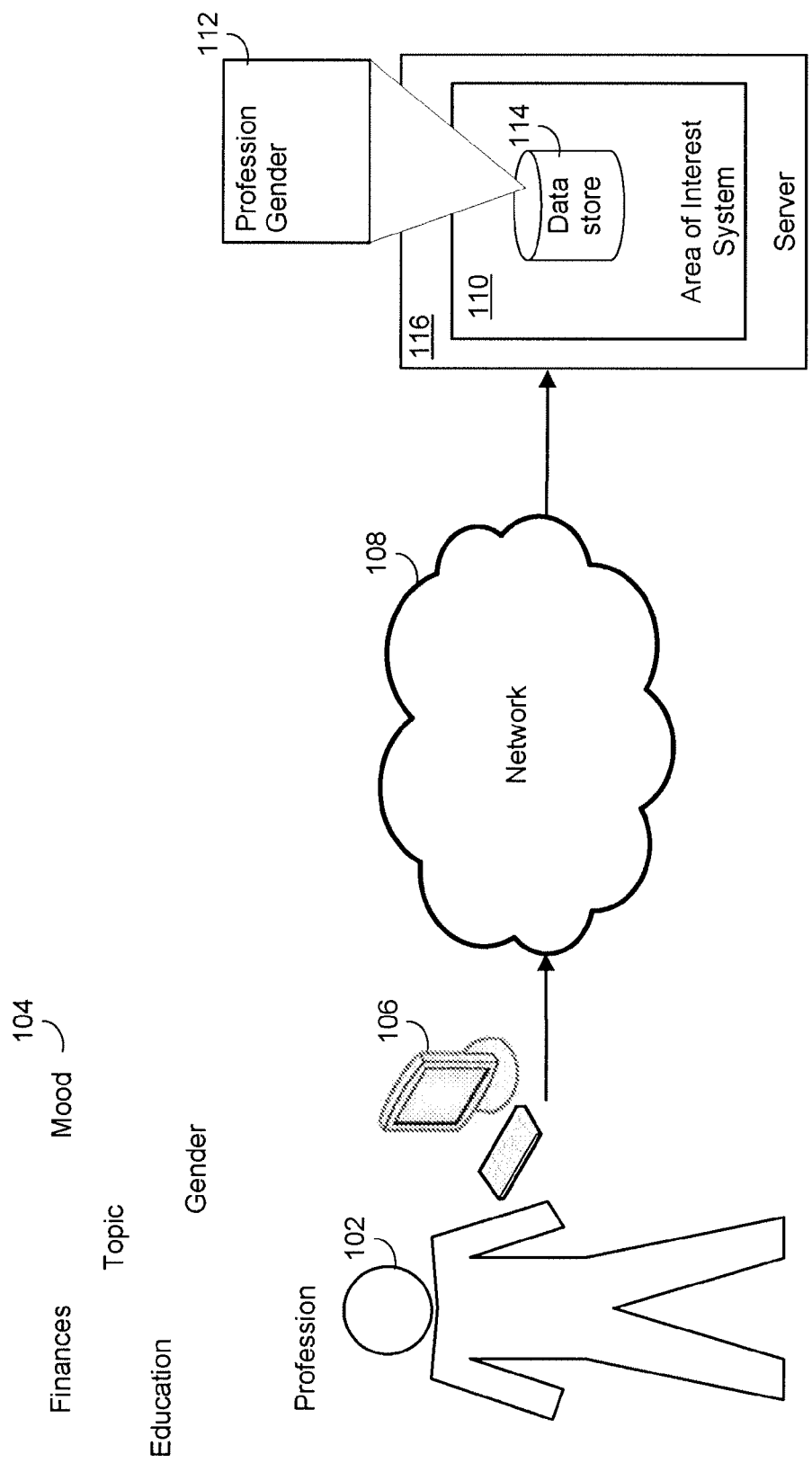
FIG. 1 is a block diagram showing a user interacting with a computer capable of deriving features of the user.

FIG. 1 is a block diagram showing a user interacting with a computer capable of deriving features of the user. As shown in FIG. 1, a user 102 is associated with multiple features 104 which describe some aspect of the user. For example, a user has features associated with his finances, he may be wealthy or impoverished, a user has features associated with his education, and he may have a graduate degree, a bachelor's degree, a high school degree, or little schooling. The user may have expertise in a particular area, for example automobiles. The user may be married and have children. Some features of the user are subject to frequent changes, for example, the user has a mood, he may be impatient, rushed, and in a hurry. On The user may be patient and thoughtful. The user may be interested in a particular topic of interest. Other features of a user tend to be permanent, for example, a user has gender. In some cases features are complements of each other. For example, if a user is not female they are likely male. In other circumstances, features are not complementary, for example, the user may search like a professional such as a doctor or a lawyer; however, a determination that the user does not search like doctor does not substantially affect the likelihood that the user searches like a lawyer. Identified features may be associated with users for various lengths of time. Features which tend to be permanent may be stored and maintained indefinitely, features which tend to be transitory may only be associated with the user for the length of a session. In some arrangements, all features are associated with the user for only a single session, where a session may be defined to be a short time period, for example 1, 2, 3, or 4 hours. For example, queries suggesting that a user is searching for a car. In some embodiments, a session may be defined by the number of queries submitted, for example, the last 10, 20, 50, or 100 queries. Examples of features which may be associated with a user for only the duration of a session include the time of the day, time of the year, or topic of interest. Once identified a feature may be associated with a user session for hours or days.

The user interacts with a client device 106 to access an area of interest system 110 over a network 108. Through interactions with the area of interest system, the user reveals features which are tracked by the area of interest system and stored in a data store 114. For example, a user may use a query term which reveals the users profession or a user may select a search result which reveals a users interests or demographics. The revealed features may be used by the system to enhance the user's experience.

Users infrequently reveal features about themselves with certainty, for example, a user may enter the query term "jaguar", this query term may indicate an interest in either automobiles or cats. Subsequent user actions may resolve the ambiguity, for example, the user selects a search results associated with cars. In some cases, users actions may remain ambiguous, for example, the user subsequently searches for "lynx". And in some cases the ambiguity may not be able to be definitively resolved. For example, suppose data suggests that users who use a specific link are 70% likely to be female. There is no way to ascertain that the use is in fact female. To account for ambiguity, the area of interest system maintains a measure of certainty associated with the feature. For example, the system may be 70% certain that the user is female, and 45% certain that the user is interested in cars.

Figure 2:
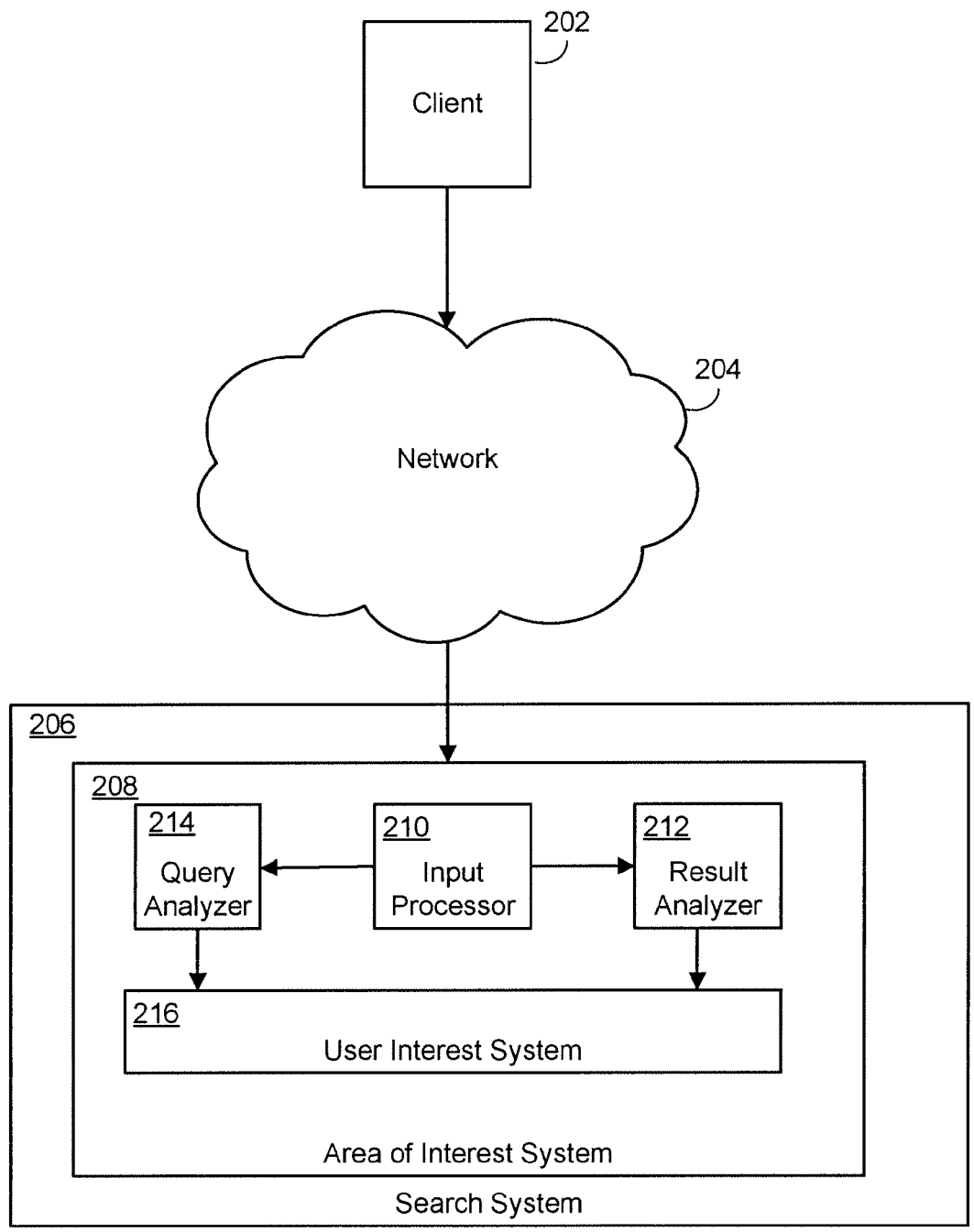
FIG. 2 is a block diagram showing an example implementation of an area or interest system.

FIG. 2 is a block diagram showing an example implementation of an area of interest system. As shown in FIG. 2, a search system may utilize the area of interest system. A client device 202 interacts with a search system 206 by sending messages over a network 204. In addition to other interactions, the client may submit queries to the search system and may select search results received from the search system. The messages are received by an input processor 210. For example, the user may submit a query, for example "neonatal care", or the user may select a result, for example "www.web-md.com". The input processor distinguishes between queries and result selections. Queries are routed to a query analyzer 214 which analyzes the query to derive features of the user of the client. Result selections are routed to a result analyzer 212 which analyzes results selections to derive features the user has revealed.

When the query or result analyzer determines a likelihood that the users has a particular feature, the feature or features are sent to the user interest system 216. The user interest system combines the newly revealed features with features previously associated with the user. For example, the user interest system may have maintained records indicating that the user has a 70% likelihood of being female and a 75% likelihood of being a medical doctor. The user may have submitted a query which revealed a 65% likelihood that the user is wealthy. The user interest system updates the information about the user to reflect they newly revealed informationSometimes the newly revealed information may support or contradict previously drawn conclusions. For example, the user may reveal a 60% likelihood of being a doctor. Under these circumstances the 60% feature is combined with the 75% feature to determine a new probability that the user is a doctor.

In some arrangements, the probabilities are combined using convention probability techniques.

Figure 3A:
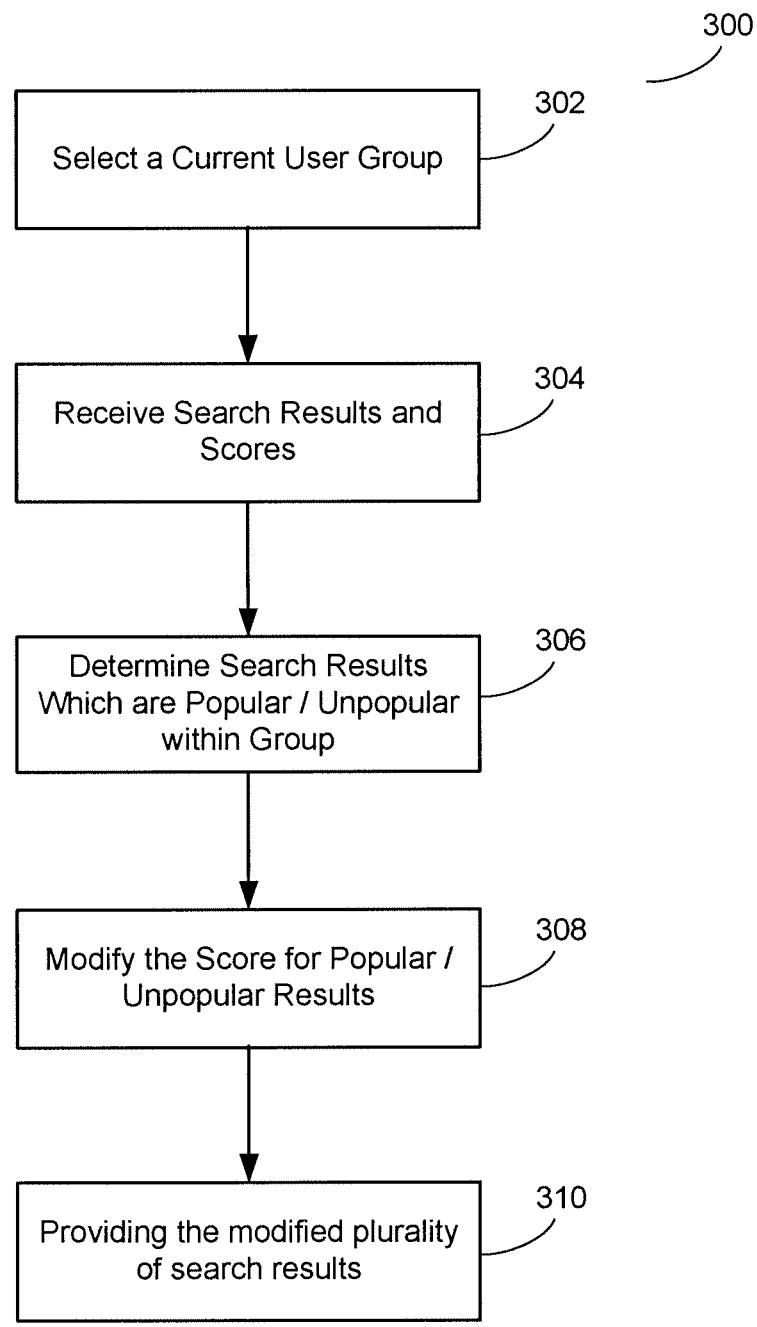
FIG. 3A is a flowchart representing operations of an area of interest system.

FIG. 3A is a flowchart representing some operations of an area of interest system. As shown in FIG. 3A, a flowchart 300 represents some operations of an area of interest system (such as the area of interest system 208 shown in FIG. 2. The operations may be executed by a single computing device (such as the server 116 shown in FIG. 1) that includes to the area of interest system. In some arrangements, multiple computing devices may also be utilized. Along with being executed at a single site, operation execution may be distributed among two or more sites.

Among other capabilities, the area of interest system selects a current user group for a current search session (302). In some embodiments, the area of interest system selects a current user group based on search results selected by a user during the search session. The user group may be defined by a group of websites that are likely to be visited in the same session. For example, if users who visit "www.nfl.com" frequently visit "www.cnnsi.com" during the same session, then "www.nfl.com" and "www.cnnsi.com" may define a user group. In this example, when a current user selects a search result in the group (e.g. www.cnnsi.com) the area of interest system may select the user group for the current session.

In some embodiments, the area of interest system selects a current user group based on a query submitted by the current user. For example, the use of a particular query term may be indicative of belonging to a group. If a current user submits a query term "color" then the user is likely from the United States. In contrast, if the user submits a query term "colour" then the user is likely from Canada or the United Kingdom. In another example, if a user enters the term "neonate" the user is likely a member of the medical profession. In another embodiment, a group may be selected based on whether query terms are misspelled.

Operations of the area of interest system also include receiving search results and scores (304). A search engine provides search results responsive to a query. The results are coupled with scores which indicate a measure of the quality of the search result.

Operations of the area of interest system also include determining search results which are either popular or unpopular within the group (306). Based on an analysis of historical interactions with search results by users in previous search sessions some search results are determined to be more popular or less popular for users in the group when compared to users in a larger population. For example, users in the "www.nfl.com/www.cnnsi.com" group may prefer www.espn.com more than users in the general population. In some embodiments, the popularity of a site for a particular group is compared to the popularity of the site for the general population of search sessions. In some embodiments, the general population of search sessions may be narrowed by language and/or country.

Operations of the area of interest system also include modifying the score for popular and unpopular results (308). A result which is more popular or less popular among members of the group has its score adjusted accordingly. Generally, more popular results receive a score boost and less popular results receive a score penalty. In some embodiments, all popular scores receive the same score boost and all unpopular results receive a score penalty. On other embodiments, the size of the boost and penalty is proportional to the popularity or unpopularity of the results, respectively.

Operations of the area of interest system also include providing the modified plurality of search result to the current user (310). The modified search results are provided to the user, generally the search results are displayed on a user interface on a client device. Generally, search results are presented in a ranked order based on their scores. Therefore, a search result that is popular within the group may be placed higher for searches within the group than it would be for a general population, while search results which are unpopular may be placed lower. Because search results are ranked based on score, a search result which receives a boost or penalty will not necessarily change its position in the ranking as compared to the position for the general population.

Figure 3B:
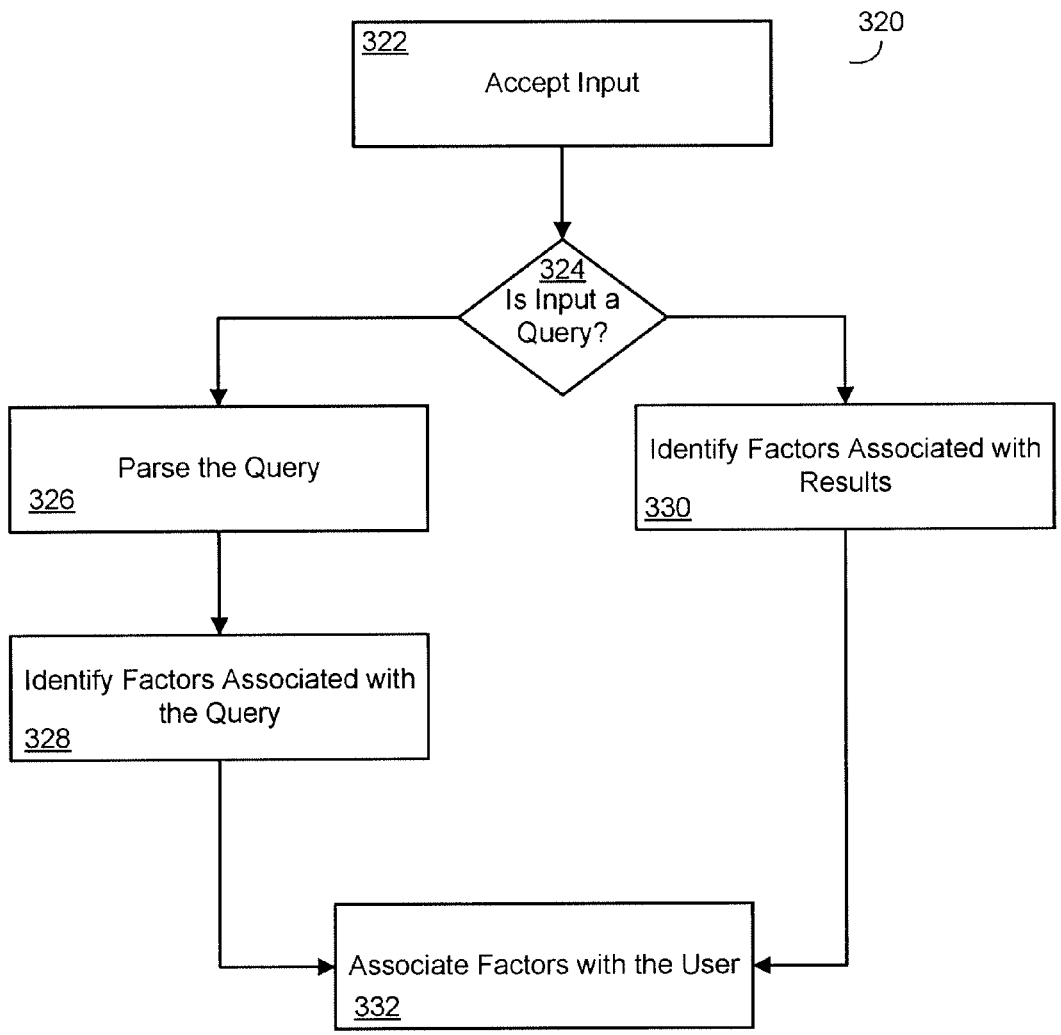
FIG. 3B is a flowchart representing operations of an area of interest system.

FIG. 3B is a flowchart representing operations of an area of interest system. As shown in FIG. 3B, a flowchart 320 represents some operations of an area of interest system (such as the area of interest system 208 shown in FIG. 2. The operations may be executed by a single computing device (such as the server 116 shown in FIG. 1) that includes the area of interest system. Among other capabilities, the area of interest system accepts input from a client (322), for example, the client 202 shown in FIG. 2. The area of interest system determines if the input is describes a query from the user, or if the action describes a result selection by the user (324).

Operations of the area of interest system may also include parsing the query (326). The system may break the query into words and phrases. These words and phrases may reveal features describing the user. For example, the query "neonatal blood pressure" may be divided into individual words "neonatal", "blood" and "pressure". The query may also be divided into phrases "neonatal blood", "blood pressure", and "neonatal blood pressure". In some arrangements, the query may be analyzed to look for known phrase or for combinations of words that could create known phrases. In other arrangements, phrases may be created out of any combination of words, for example "neonatal pressure."

Operations of the area of interest system may also include identifying features associated with the query (328). The parsed query may be analyzed to determine features associated with the query. For example, spelling may be indicative of the user's country of origin. For example, using the British spelling of words like "colour", "flavour", "centre", "meter", "offence", "defence", "aeroplane" etc. . . . reveals that the user is likely from the United Kingdom. Using American spelling of the same words "color", "flavor", "center", "meter", "offense", "defense", "airplane", etc. . . . reveals that the user is likely of United States origin. Using a mixture of British and English spelling reveals that the user is likely Canadian.

Misspelled words may reveal information about the user. For example, consistently misspelling words may suggest less education, that the user is in a hurry, or simply that the user is a poor speller. Word choice may also reveal information about the user. Some terms are used almost exclusively by individuals of a given profession. For example, using terms "neonate" instead of "baby" and "ocular" instead of "eye" reveals a likelihood that the user is in the medical profession. Other words reveal that the user is likely in another profession. For example, "defeasance" indicates the user is likely a lawyer.

Phrases in queries may also reveal likely features that describe the user. For example, queries concerning the price of luxury cars indicate likelihood that the user is wealthy. In contrast, queries concerning the price of used sofas indicate likelihood that the user is not wealthy. Words and phrases which reveal features may be said to have contrast with respect to those features.

Other query behavior may also reveal features of the user, for example, a user may issue multiple query refinements. A query refinement is a query which is a modification of a previous query. Multiple query refinements may reveal that the user is uncertain or a novice searcher.

Queries may also reveal the topic of interest of the user. By comparing topic of interest of previous users who entered the query the topic of interest of the user entering the query may be revealed. In some scenarios, a query may ambiguously identify a topic of interest. For example, if half of previous users entering "jaguar" were interested in the car company and half were interested in the animal, the system cannot make a certain determination of a topic of interest. Subsequent queries may resolve the ambiguity allowing a topic of interest to be ascertained. For example, if the user subsequently enters "lions" the user has revealed a topic of interest of "cats". The topic of interest is revealed even though the query "lions" is itself ambiguous between the Detroit Lions and the animal.

Operations may also include identifying features revealed by result selections (330). For example, the user of a search engine may select a search result provided from the search engine. The selection of a result may reveals information about the user. For example, some resources are more frequently selected by men and women and other resources are more frequently selected by women than men. A woman may be more likely to visit "iVillage", whereas a man may be more likely to visit "Cars.com." Each resource the user may select may be associated with features that selection of the site reveals. For example, selection of one site may reveal that the user is 70% likely to be male, 40% likely to be rich; and 30% likely to be an electrician. Resources may also be associated with topics of interest. For example, if a user selects www.pga.com he is likely interested in golf. Some resources may be associated with multiple topics of interest. For example, www.amazon.com may be predominately associated with purchasing books, but may also be associated with purchasing electronics, movies, or music.

In some embodiments, the importance of a selection of a search result may be further quantified based on the amount of time that a user spends with the search result. For example, if the user selects a search result and does not return or does not return for a substantial period of time (for example, a minute, two minutes, five minutes), the user was likely satisfied by the search result, and is likely to share the features associated with the search result. In contrast, if the user clicks on the search result and then rapidly selects another search result, its likely that the first search result did not satisfy the user and the user is less likely to share features associated with the search result.

Operations may also include associating the features with the user (332). Once the system identifies the features revealed by the user's actions, the system associates those features with the user. This information may be stored in a user session or in any other data storage.

Information associating features to resources may be obtained using conventional survey technique. Individual users who elect to provide information about themselves may have their web browsing habits tracked and compiled to generate statistics about which sites are frequented by users having particular features.

Figure 3C:
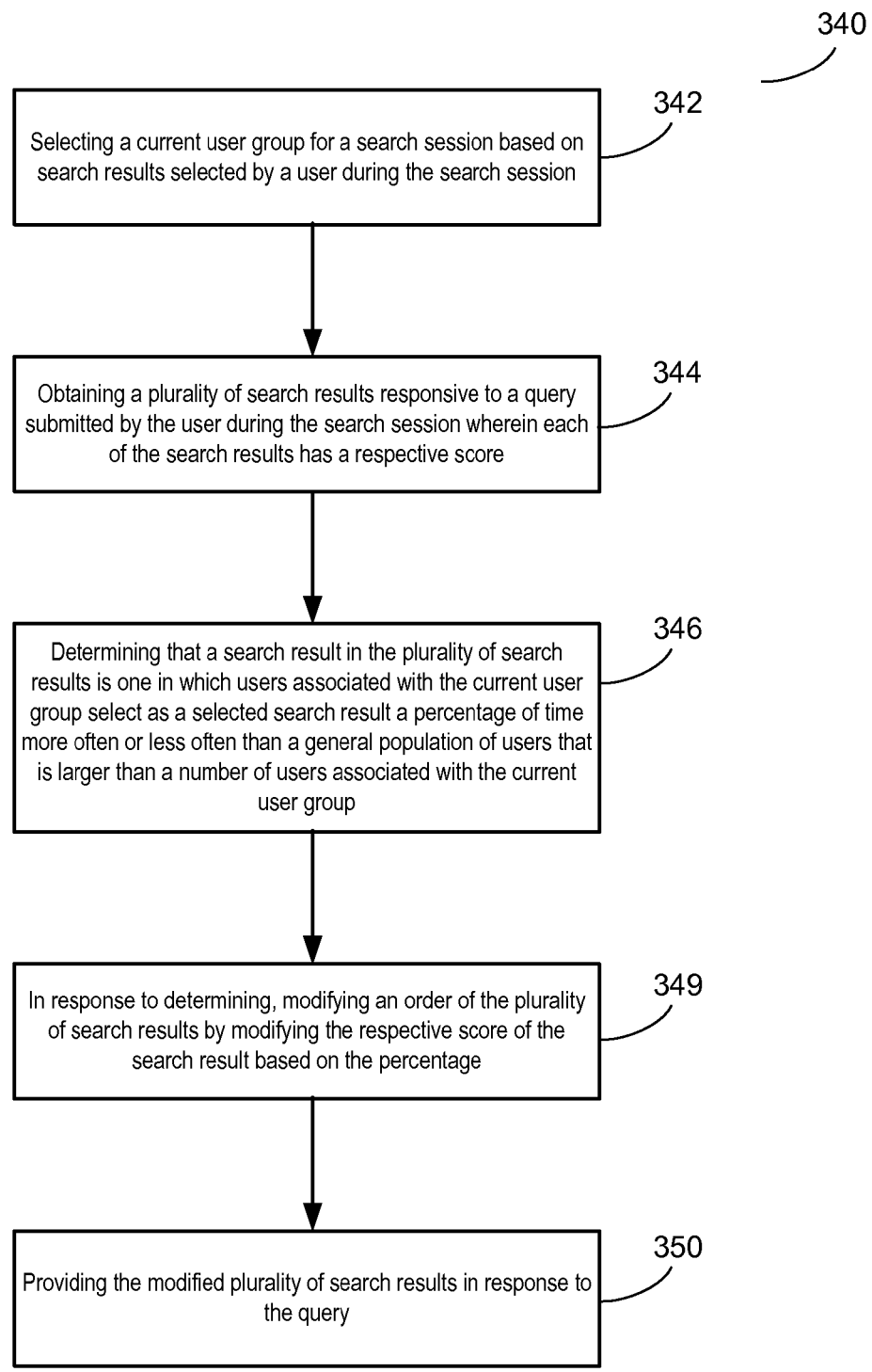
FIG. 3C is a flow chart representing example operations of an area of interest system.

FIG. 3C is a flow chart representing example operations 340 of an area of interest system. Selecting a current user group for a search session based on search results selected by a user during the search session (342). Obtaining a plurality of search results responsive to a query submitted by the user during the search session wherein each of the search results has a respective score (344). Determining that a search result in the plurality of search results is one in which users associated with the current user group select as a selected search result a percentage of time more often or less often than a general population of users that is larger than a number of users associated with the current user group (346). In response to determining, modifying an order of the plurality of search results by modifying the respective score of the search result based on the percentage (349). Providing the modified plurality of search results in response to the query (350).

Figure 3D:
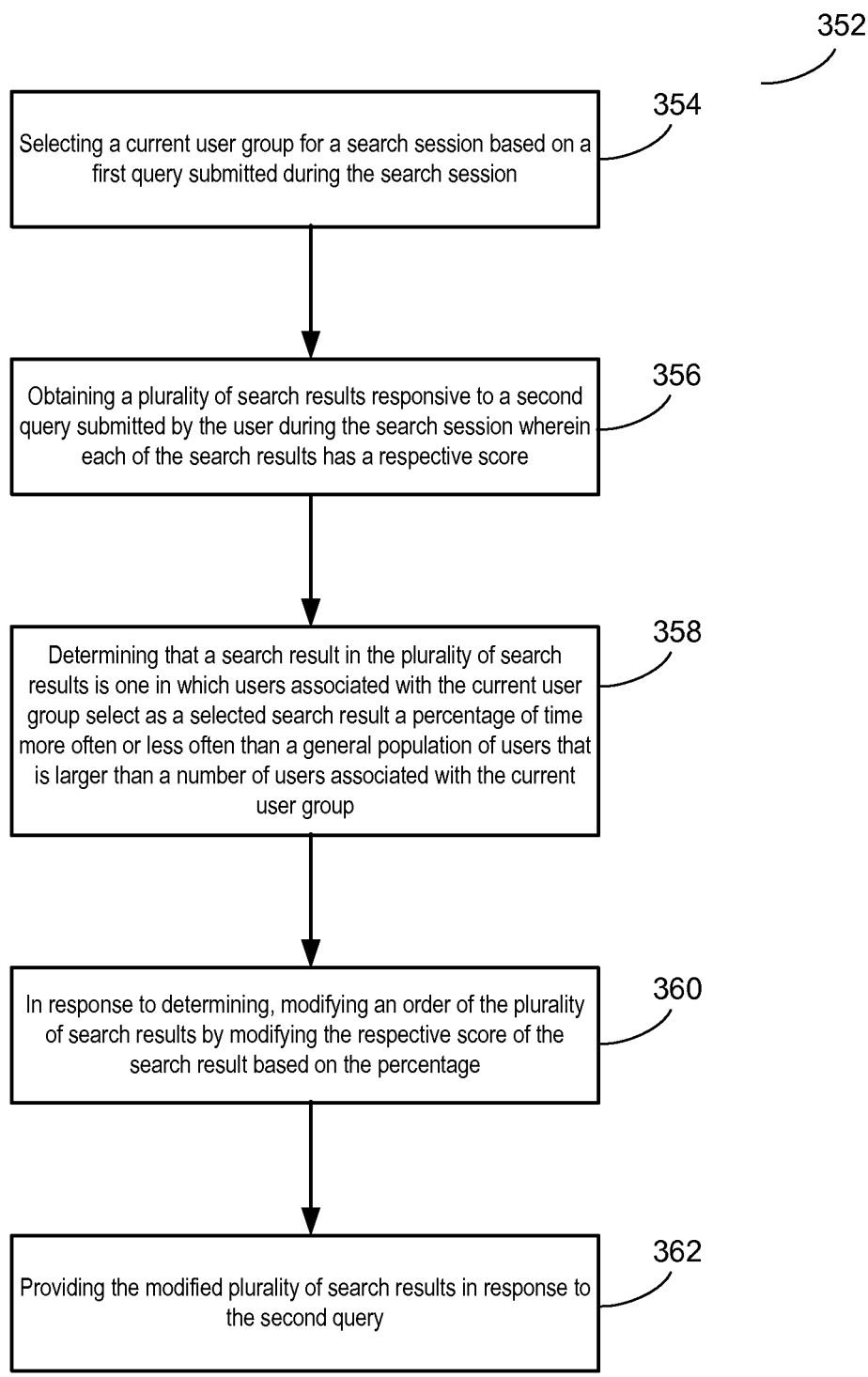
FIG. 3D is another flow chart representing example operations of an area of interest system.

FIG. 3D is another flow chart representing example operations 352 of an area of interest system. Selecting a current user group for a search session based on a first query submitted during the search session (354). Obtaining a plurality of search results responsive to a second query submitted by the user during the search session wherein each of the search results has a respective score (356). Determining that a search result in the plurality of search results is one in which users associated with the current user group select as a selected search result a percentage of time more often or less often than a general population of users that is larger than a number of users associated with the current user group (358). In response to determining, modifying an order of the plurality of search results by modifying the respective score of the search result based on the percentage (360). The modified plurality of search results are then provided in response to the second query (362).

Other user behavior may reveal a user's features. For example, the user's current mood may be revealed by the user's browsing behavior. A user may select many results for each query or may select only one. A user may reveal that he is lost by selecting the next page of search results numerous times. A user may make a large number of long clicks. A user may make a large number of short clicks.

Figure 4:
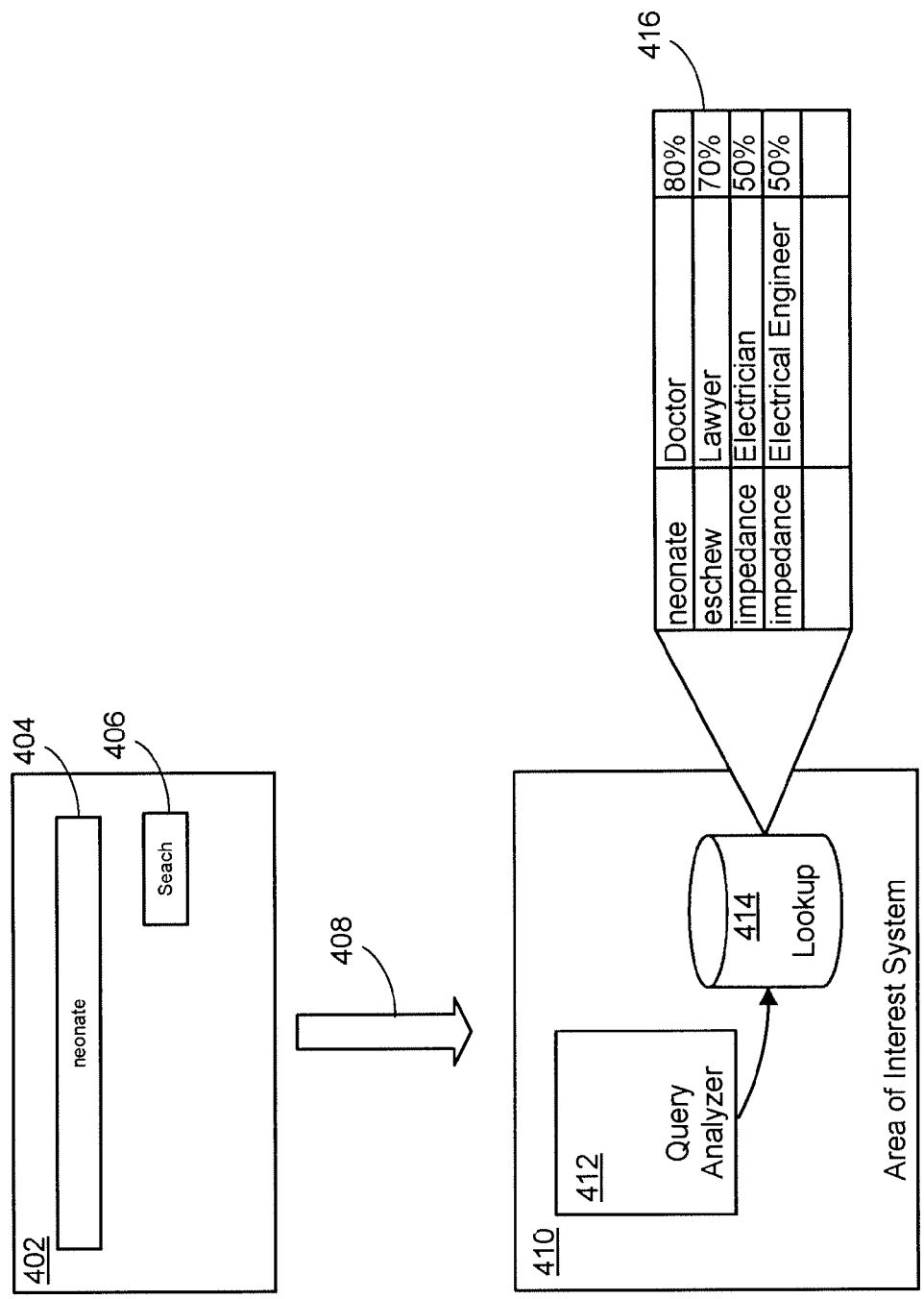
FIG. 4 is a block diagram showing user interaction with a search engine.

Other characteristics associated with the user may also reveal features about the user. For example, a user may prefer certain sites due to the user's Internet connection speed. A user with low-speed connections may not prefer high definition video results or other resource intensive websites. A preference for some popular sites may indicate a preference for other sites. For example, some users like www.wikipedia.org, others do not. A user may prefer sites that contain many images. A user may prefer sites that contain simpler text. For example a user who selects a site directed to children may prefer similar results in the next query. A user may prefer websites based on the presence of accessibility features, for example meta-text on images. FIG. 4 is a block diagram showing user interaction with a search engine. As shown in FIG. 4, a user may interact with a user interface 402. In this example, the user interface is a web page which provides an interface to a search engine. The web page contains a text input field 404 and a search button 406 for submitting the text input. Represented by process arrow 408, the user submits the query to the area of interest system 410. In this example, the area of interest system forwards the request to the query analyzer 412. The query analyzer parsers the query, as described above, and determines words and phrases in the query, for example "neonate." The query analyzer looks up the query words and phrases in a data store 414. In this example, the query "neonate" corresponds to a feature of "doctor" with an 80% degree of certainty. In some scenarios, terms may correspond to more than one feature, for example, in FIG. 4, the term "impedance" corresponds to both an electrician and an electrical engineer. The area of interest system associates the feature "doctor" with an 80% degree of certainty with the user or session.

Figure 5:
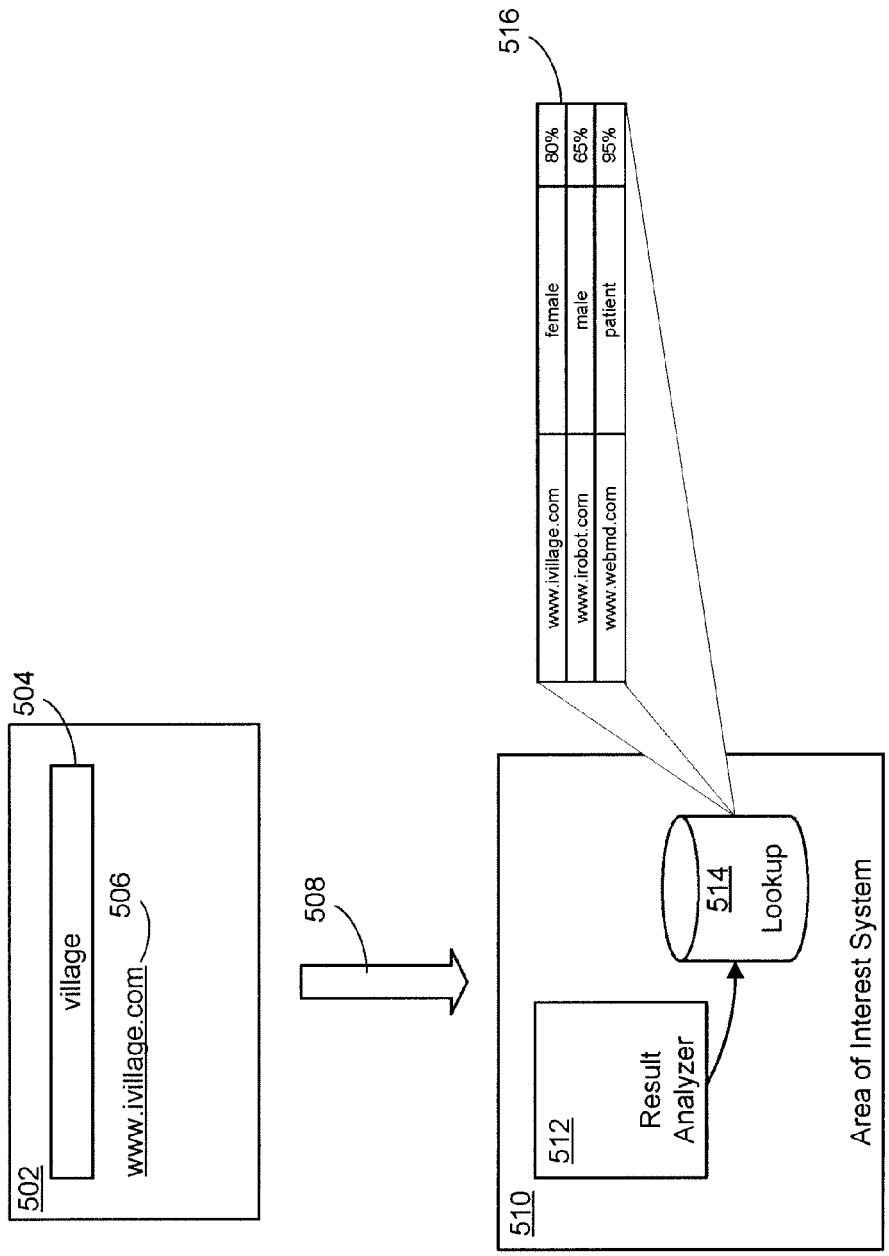
FIG. 5 is a block diagram showing user interaction with a search engine.
Figure 6:
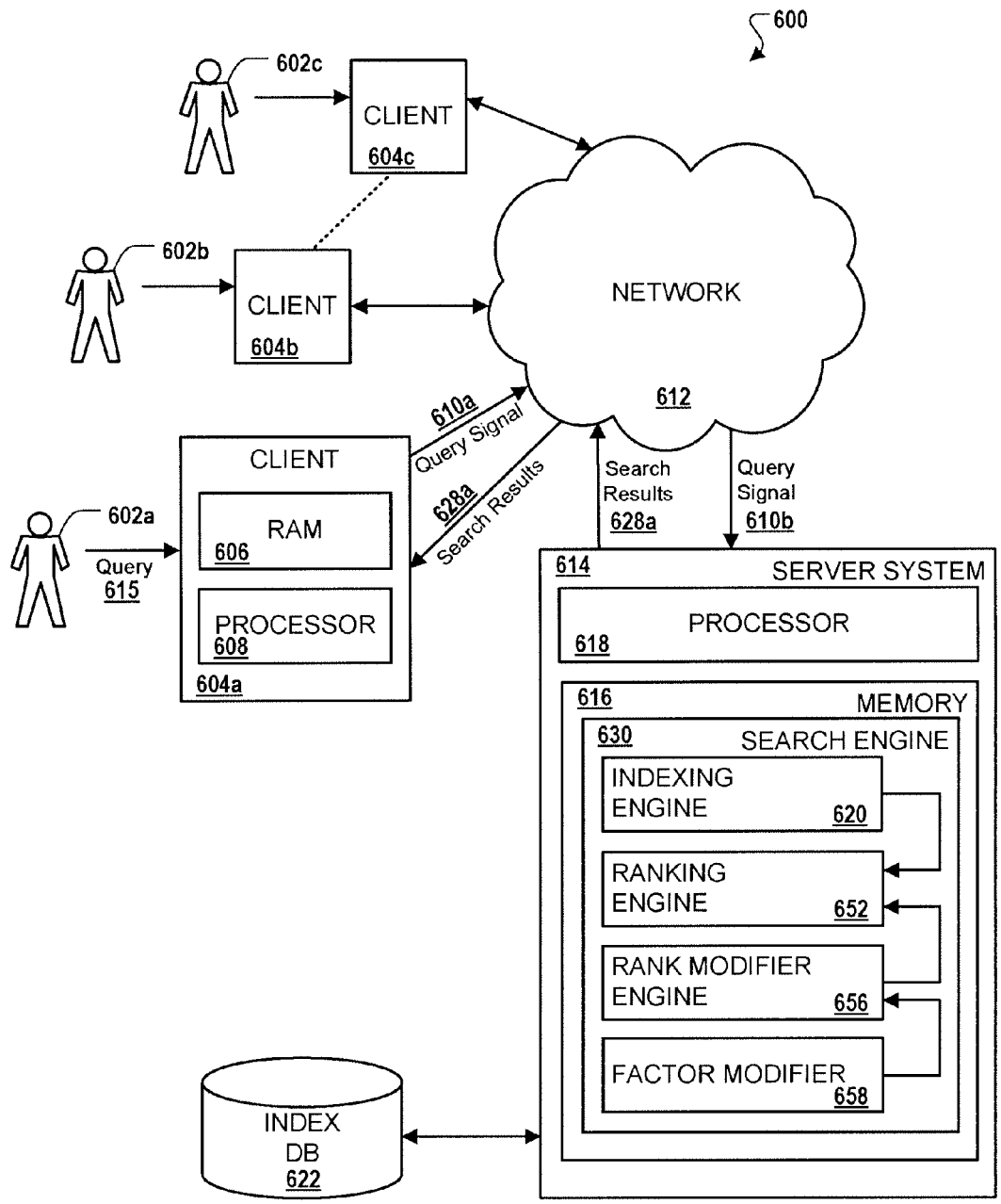
FIG. 6 is a block diagram of an exemplary environment in which an area of interest system may be used.

FIG. 5 is a block diagram showing user interaction with a search engine. As shown in FIG. 5, a user may interact with a user interface 502. In this example, the user interface is a search results page, having a text input field 504 and search results 506. Represented by process arrow 508, the user submits the query to the area of interest system 510. In this example, the area of interest system forwards the request to the result analyzer 512. The result analyzer looks up the selected resource data store 514. In this example, the resource "www.ivillage.com" corresponds to a feature of "female" with an 80% degree of certainty. The area of interest system associates the feature "female" with an 80% degree of certainty FIG. 6 is a block diagram of an exemplary environment in which an area of interest system may be used. Once features are identified and associated with users they may be used to provide customized service to the user. As shown in FIG. 6, a system 600 may use the revealed features improve the relevance of search results obtained from submitting search queries as can be implemented in an internet, intranet, or other client/server environment. The system 600 is an example of an information retrieval system in which the systems, components and techniques described below can be implemented. Although several components are illustrated, there may be fewer or more components in the system 600. Moreover, the components can be distributed on one or more computing devices connected by one or more networks or other suitable communication mediums.

A user 602 (602a, 602b, 602c) can interact with the system 600 through a client device 604 (604a, 604b, 604c) or other device. For example, the client device 604 can be a computer terminal within a local area network (LAN) or wide area network (WAN). The client device 604 can include a random access memory (RAM) 606 (or other memory and/or a storage device) and a processor 608. The processor 608 is structured to process instructions within the system 600. In some implementations, the processor 608 is a single-threaded processor. In other implementations, the processor 608 is a multi-threaded processor. The processor 608 can include multiple processing cores and is structured to process instructions stored in the RAM 606 (or other memory and/or a storage device included with the client device 604) to display graphical information for a user interface.

A user 602a can connect to a search engine 630 within a server system 614 to submit a query. When the user 602a submits the query through an input device attached to a client device 604a, a client-side query signal 610a is sent into a network 612 and is forwarded to the server system 614 as a server-side query signal 610b. Server system 614 can be one or more server devices in one or more locations. The server system 614 includes a memory device 616, which can include the search engine 630 loaded therein. A processor 618 is structured to process instructions within the system 614. These instructions can implement one or more components of the search engine 630. The processor 618 can be a single-threaded processor or a multi-threaded processor, and can include multiple processing cores. The processor 618 can process instructions stored in the memory 616 related to the search engine 630 and can send information to the client device 604, through the network 612, to create a graphical presentation in a user interface of the client device 604 (e.g., a search results web page displayed in a web browser).

The server-side query signal 610b is received by the search engine 630. The search engine 630 uses the information within the user query 615 (e.g. query terms) to find relevant documents. The search engine 630 can include an indexing engine 620 that actively searches a corpus (e.g., web pages on the Internet) to index the documents found in that corpus, and the index information for the documents in the corpus can be stored in an index database 622. This index database 622 can be accessed to identify documents related to the user query 615. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 630 can include a ranking engine 652 to rank the documents related to the user query. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in some systems that treat a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 652 can receive an additional signal from a rank modifier engine 656 to assist in determining an appropriate ranking for the documents. The rank modifier engine 656 provides one or more measures of relevance for the documents, which can be used by the ranking engine 652 to improve the search results' ranking provided to the user 602.

Various types of information may be provided to the rank modifier engine 656 for improving the ranking of documents. For example, one or more features associated with a user may be identified and used to adjust rankings of search results. To determine such features of a user, and to adjust rankings based on the features, the search engine 630 can include a feature modifier 658 that may implement one or more feature adjustment techniques based on features the search requester revealed to a profile system. Additionally, as discussed above, information related to interactions between the user and search results (e.g. how long a user spends with a particular search result) may be used to adjust the features and to adjust search result rankings. Once identified, data representing the features may be cataloged in a database (e.g., the index db 622). Further, the identified features may be used for various applications such as providing assistance during future search sessions performed by the user 602a or other users. Search result scoring and ranking (e.g., as performed by the ranking engine 620 or the rank modifier engine 656) can be adjusted to account for features related to the user 602a or similar users.

The search engine 630 can forward the final, ranked result list within a server-side search results signal 628a through the network 612. Exiting the network 612, a client-side search results signal 628b can be received by the client device 604a where the results can be stored within the RAM 606 and/or used by the processor 608 to display the results on an output device for the user 602a.

Figure 7:
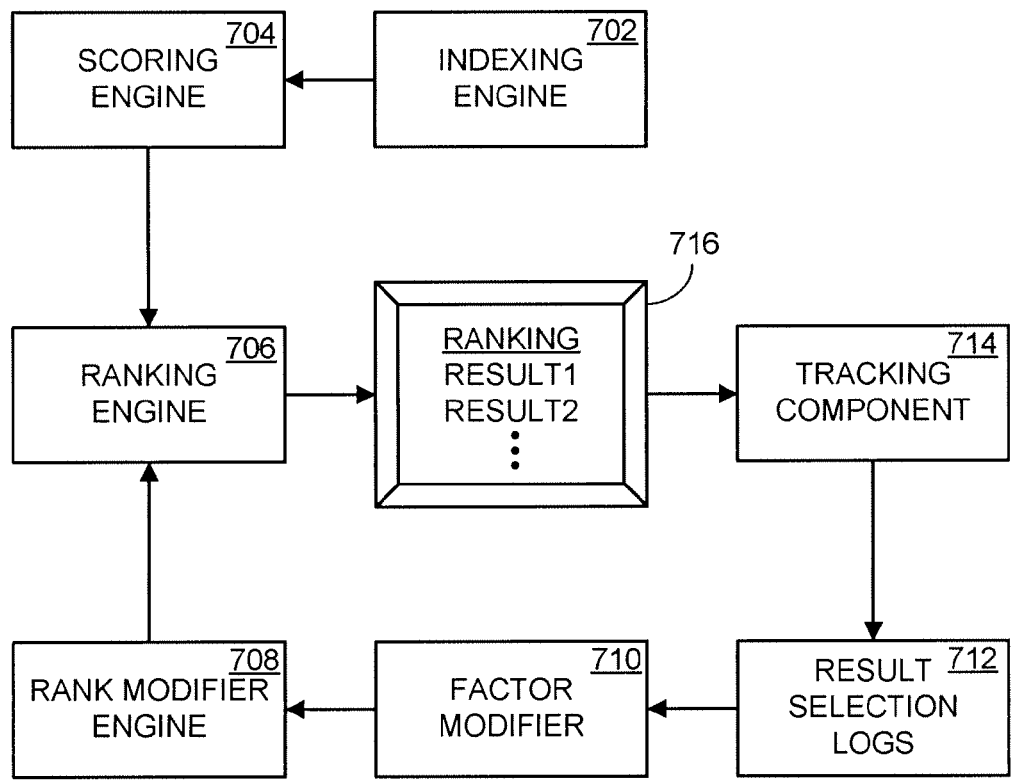
FIG. 7 is a block diagram showing example components of an information retrieval system.

FIG. 7 is a block diagram showing example components of an information retrieval system. These components can include an indexing engine 702, a scoring engine 704, a ranking engine 706, a rank modifier engine 708, and a feature modifier 710. The indexing engine 702 can function as described above for the indexing engine 620. In addition, the scoring engine 704 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as a rank of the document or the domain. Moreover, the particular functions used by the scoring engine 704 can be tuned, to adjust the various feature contributions to the final IR score, using automatic or semi-automatic processes.

The ranking engine 706 can produce a ranking of document results 716 for display to a user based on IR scores received from the scoring engine 704 and one or more signals from the rank modifier engine 708. The rank modifier engine 708 can adjust rankings at least in part based on data received from the feature modifier 710. Along with being provided data from the result selection logs 712, other sources may provide information to the feature modifier 710, for example, features previously revealed by the user. In this particular example, the feature modifier 710 provides information to the rank modifier engine 708 for ranking adjustments, however other architectures may be implemented. For example, feature information may be provided by the feature modifier 710 to the indexing engine 702 or one or more other components of the information retrieval system. A tracking component 714 can be used to record information regarding individual user selections of the results presented in the ranking 716. For example, the tracking component 714 can be embedded JavaScript code included in a web page ranking 716 that identifies user selections (clicks) of individual document results and also identifies when the user returns to the results page, thus indicating the amount of time the user spent viewing the selected document result. In other implementations, the tracking component 714 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in the result selection log(s) 712. The recorded information can include log entries that indicate, for each user selection, the query (Q), the document (D), the time (T) on the document, the language (L) employed by the user, the country (C) where the user is likely located (e.g., based on the server used to access the IR system), and previously revealed features. Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Moreover, similar information (e.g., IR scores, position, etc.) can be recorded for an entire session, or multiple sessions of a user, including potentially recording such information for every click that occurs both before and after a current click.

The information stored in the result selection log(s) 712 can be used by one or more components of the information retrieval system. For example, information could be provided to the feature modifier 710 and the rank modifier engine 708 in generating the one or more signals to the ranking engine 706. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings. Additionally, one or more features representative of user characteristics can be used to modify rankings. In some arrangements, the user interaction and the feature data may be provided to one or more server systems (e.g., server system 614) for use and storage (e.g., database 622) for later retrieval.

The components shown in FIG. 7 can be combined in various manners and implemented in various system configurations. For example, the scoring engine 704 and the ranking engine 706 can be merged into a single ranking engine, such as the ranking engine 652 of FIG. 6. The feature modifier 710, the rank modifier engine 708 and the ranking engine 706 can also be merged, and in general, a ranking engine includes any software component that generates a ranking of document results after a query. Moreover, a ranking engine can be included in a client system in addition to (or rather than) in a server system.

Figure 8:
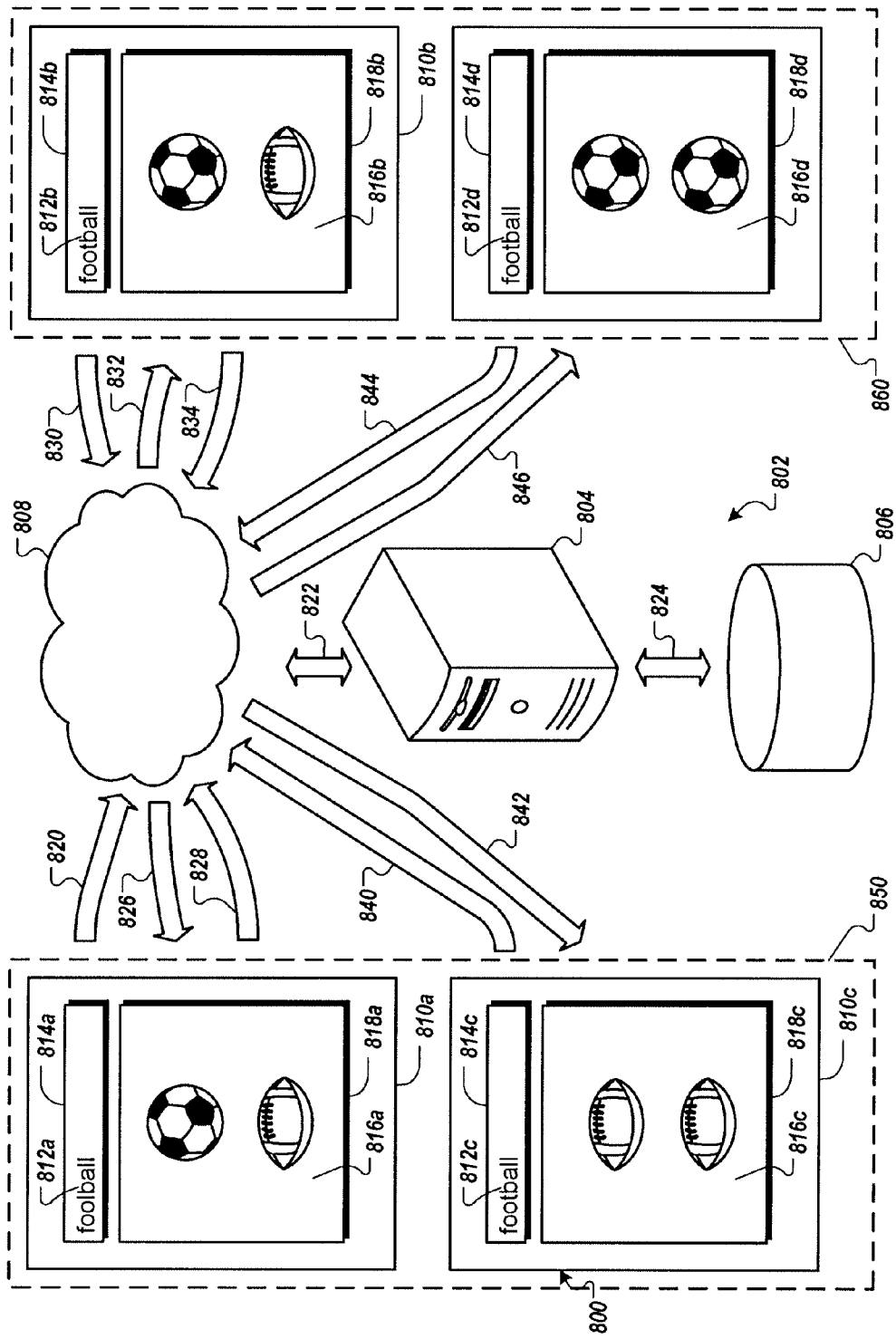
FIG. 8 is a block diagram showing how user groups may influence search results.

FIG. 8 is a block diagram showing how user groups may influence search results. As shown in FIG. 8, operations of an exemplary set of search sessions of an exemplary information retrieval system 800 are illustrated. Similar to the systems shown in FIGS. 6 and 7, the information retrieval system 800 shown in FIG. 8 can provide relevant results for search queries. For example, similar to client device 604 (shown in FIG. 6), client side systems 810a, 810b, 810c and 810d can enable users to enter search queries and interact with search results. Also, similar to server system 614 (also shown in FIG. 6), a server side system 802 can process search queries and generate search results that are correspondingly provided to any of the client side systems 810a-d. Being scalable, more or fewer client side systems and server side systems may be included in the information retrieval system 800.

The client side systems 810a-d may each include a query interface 814a-d (e.g., text entry control, type-ahead search control, selectable list, etc.) enabling a user to provide search queries. The client side systems 810a-d may also each include a results interface 818a-d that enables a user to view and interact with query results. Query result content may be provided in various types of representations; for example, such content may be provided in links (e.g., uniform resource locators (URLs)), text (e.g., relevant content portions, summaries, etc.), media (e.g., graphics, video, audio, etc.), individually or in combination. Any of the results interfaces 818a-d may be provided by one or more output devices (e.g., video display, audio playback system, etc.). Various types of equipment may be included in the server side system 802 to access, process, and store content. For example, one or more servers (represented by a server 804) and one or more data stores (represented by a data store 806) may be incorporated into the server side system 802. One or more communication techniques may be implemented for exchanging data among the client side systems 810a-d, the server side system 802, and other data sources (not shown). For example, one or more networking techniques may be used to provide communication through a network 808 (e.g., the Internet) such as wired or wireless (or a combination of wired and wireless) connections.

To search for desired content (e.g., documents, video, audio, etc.) a user typically provides information representative of a query to any of the client side systems 810a-d. For example, a search session can be established in which multiple user queries are entered over a period of time (e.g., ten seconds, a minute, ten minutes, thirty minutes, an hour, two hours, etc.). Additionally, a query session may also include user interactions (e.g., clicking, scrolling, viewing, etc.) with search results based on the entered query. Upon entering a query and receiving a set of query results (e.g., links), the user may interact with the results by clicking one or more links, for example, based on associated information (e.g., text descriptions, media, etc.). Click data, which may be represented by selecting a link, visiting a resource (e.g., a web page) associated with a selected link for an amount of time (e.g., five seconds, one minute, five minutes, etc.), or other type of user interaction may be collected during a search session. Lack of user interactions, for example, proceeding to another set of search results without selecting a link, may be collected and stored. To store the collected information one or more techniques may be implemented, for example, a web browser cookie may be maintained by any of the client systems 810a-d that represents the collected information or a portion of the information.

Along with collecting user interactions (or lack of interactions) detected during a search session, other information may be collected. For example, collected information may include features revealed by a user of any of the client side systems 810a-d. The revealed features may be commonly shared among multiple users (for example, multiple doctors may utilize the search engine), this information may be used to assist subsequent searches during the same search session or during future search sessions. If a group of users commonly sharing a particular feature are found to generally prefer a particular query result (e.g., based on click data, interactions with results, etc.), for example, the information retrieval system may associate the result preferences with the feature. For example, statistics (e.g., counts, averages, time-related data, etc.) related to query result preferences may be gathered and stored (e.g., in the data store 806) in association with one or more identified features. The statistics may be used to modify search result rankings for users associated with the features, for example.

One or more techniques and methodologies may be implemented, alone or in combination, to identify features. For example, a user's country of origin may be determined from the spelling conventions the user demonstrates. For example, if a user specifies a search for "aeroplane", for example, an inference may be made that the user is from the United Kingdom. Features relating to demographics (e.g., gender, age, etc.) and other traits (e.g., profession, level of education, etc.), for example, may be inferred by examining search queries and interactions from a search session. For example, it may be surmised that a user providing search queries including medical terminology (as opposed to common terminology) and interacting with search results of a technical nature (e.g., medical journal articles, etc.) may be a member of the medical profession. Additionally, particular words and spelling patterns may detected for identifying user features. For example, such words and spelling patterns may be indicative of a particular nationality (e.g., using the spelling "color" vs. "colour" may indicate an American nationality). As another example, frequent correct or incorrect spelling may be indicative of a high or low level of education. Such inferences may be used to identify one or more features associated with the user and the identified features may be used to provide more relevant search results to the user, for example.

As shown in FIG. 8, a search session may be initiated by a query being provided by a user. In this example, a search session is initiated by a search query 812a (e.g., "football") being entered via the query interface 814a of the client side system 810a. As shown by process arrows 820 and 822, the search query 812a and features revealed by the user may be sent to the server side system 802 via the network 808. The server side system 802 can process the search query 812a and related information, for example by using one or more software modules (e.g., a search engine) executed by the server 804. As shown by process arrow 824, data (e.g., index information, features, search session statistics, etc.) may be retrieved from or stored in the data store 806 and can be used by the server 804 for providing a set of query results. Data store 806 is representative of various types of information sources that may be in communication with the server 804. For example, one or more storage devices (e.g., hard drives, etc.), servers, and computing device equipment may be directly or indirectly (e.g., via one or more networks) in communication with the server 804. As shown by process arrows 822 and 826, search results may be sent to the client side system 810a via the network 808. Upon receipt, a set of search results 816a may be presented to the user via the results interface 818a. For illustrative purposes, the search results 816a (and search results 816b-d) are shown as graphical representations, however, other representations (e.g., text, links, etc) may be shown individually or in combination with the graphics.

Multiple client devices may conduct concurrent search sessions in the informational retrieval system 800. In this example, a user of the client side system 810b may initiate a search session by entering a search query 812b (e.g., "football") via the query interface 814b. As shown by process arrows 830 and 822, the search query 812b may be sent to the server side system 802 via the network 808. The server side system 802 can process the search query 812b and related information, and as shown by process arrows 822 and 832, search results may be sent to the client side system 810b via the network 808. Upon receipt, a set of search results 816b may be presented to a user via the results interface 818b.

As shown in this example, in some instances, the information retrieval system 800 may initially provide similar query results (e.g., 816a, 816b) based on similar search queries (e.g., 812a, 812b). For example, multiple search result categories (e.g., Association football or soccer, Gridiron or American football, etc.) may be relevant to a search query (e.g., "football"), based on global search data and statistics. However, a user having one or more features may be determined to generally prefer a particular search result or search result category. For example, for the search query "football", a user with an origin in the United States may prefer search results that pertain to American football, and a user with an origin in England may prefer search results that pertain to Association football (soccer). In this example, the user of client side system 810a may be identified as being associated with a feature 850 (e.g., United States nationality). The user of client side system 810a in this example may interact with the search results 816a (e.g., by selecting a particular result, by viewing information associated with the selected result for a certain amount of time, by scrolling through the results, by proceeding to another set of search results, etc.). For example, the user of client side system 810a may select a query result link related to American football. As shown by process arrows 828 and 822, data related to the interaction, in addition to information associated with the identified feature 850 (e.g., a location in the United States), may be sent to the server side system 802 via the network 808. Additionally, in this example, the user of client side system 810b may be associated with a feature 860 (e.g., English nationality). The user of client side system 810b in this example may interact with the search results 816b. For example, the user of client side system 810b may select a query link related to Association football (soccer). As shown by process arrows 834 and 822, data related to the interaction, in addition to information associated with the identified feature 860 (e.g., English nationality), may be sent to the server side system 802 via the network 808.

One or more techniques may be implemented to detect when a user has revealed a feature. For example, the information retrieval system 800 may track preferred search results for search requestors (e.g., users) relative to one or more features associated with the search requestors to produce one or more metrics. Upon the metric reaching a defined value, for example, one or more preferred search results may be determined for a search query provided by a search requestor associated with an identified feature. For example, as shown by process arrow 824, server side system 802 may store information related to a search result preference (e.g., a preference for American football) based on a search query (e.g., search query 812a, "football") provided by a search requestor (e.g., the user of client side system 810a) associated with an identified feature (e.g., feature 850, United States nationality). Correspondingly, the server side system 802 may store information related to a search result preference (e.g., a preference for Association football) based on a search query (e.g., search query 812b, "football") provided by a search requestor (e.g., the user of client side system 810b) associated with another identified feature (e.g., feature 860, English nationality). Metrics (e.g., counts, percentages, weightings, etc.) may be produced (and maintained) for the revealed features, provided search queries, and preferred search results. For example, a count may be maintained for search results (e.g., results related to American football) preferred by search requestors associated with an identified feature 850 (e.g., United States nationality) for a particular search query (e.g., "football"). Similar counts may be maintained for search results (e.g., results related to Association football) preferred by search requestors associated with other features (e.g., English nationality). As such, multiple metrics may be produced (and maintained) for multiple revealed features, multiple search queries, and multiple search results, for example.

From the revealed features, the ranking of results for later submitted queries may be accordingly adjusted. For example, previously submitted queries, identified features, etc. that reflect one or multiple characteristics of a search requestor may be used to adjust rankings. Referring to the figure, a user of client side system 810c may provide a search query 812c (e.g., "football") via the query interface 814c, which, similar to the user of client side system 810a, may reflect the location of the user. Also similar to client side system 810a, client side system 810c may be associated with one or more features such as the feature 850 (e.g., United States nationality). As shown by process arrows 840 and 822, the search query 812c and feature information (e.g., information associated with feature 850) may be sent to the server side system 802 via the network 808. The server side system 802 can process the search query 812c and related information, for example by using one or more software modules (e.g., a search engine) executed by the server 804. For example, an feature modifier included in the search engine may identify one or more features associated with the user of the client side system 810c (e.g., feature 850, a United States nationality) and may adjust the ranking of search results based on metrics (e.g., counts, percentages, weightings, etc.) associated with the identified features, provided search queries, preferred search results, etc. In this example, information associated with the metrics may be retrievable from the data store 806 for use by one or more software modules (e.g., the feature modifier 658, shown in FIG. 6 to adjust the search results rankings.)

While one feature may be used for adjusting query results, in some arrangements, multiple features may be utilized for ranking results. Further, assigning priorities, weighting, and other techniques and methodologies may be used to distinguish and enhance one (or more) features from another features (or multiple features). For example, in some implementations, features associated with the language of a user may be given a higher priority compared to features associated with the country of origin. As shown by process arrows 822 and 842, in this example, adjusted search results may be sent to the client side system 810c via the network 808. Upon receipt, search results 816c may be presented to the user via the results interface 818c. Search results may be adjusted and presented in a manner which accentuates results determined to be relevant to users. For example, search results that reflect one or more features of the users may be considered more relevant. Continuing with this particular example, the search results 816c may be adjusted such that the ranking of results pertaining to American football are generally increased and the ranking of results pertaining to other types of football are generally decreased or in some instances, actively suppressed.

Similar to client side system 810b, a user of client side system 810d may provide a search query 812d (e.g., "football") via the query interface 814d. Also similar to client side system 810b, the client side system 810d or the user may be associated with feature 860 (e.g., a origin in England). As shown by process arrows 844 and 822, the search query 812d and featureal information (e.g., information associated with feature 860) may be sent to the server side system 802 for processing by using one or more software modules (e.g., a search engine). For example, an feature modifier included in a search engine may identify one or more features associated with the user of the client side system 810d. Upon identifying the feature(s), the feature modifier may adjust the ranking of search results, e.g., based on metrics associated with previously revealed features, provided search queries, and preferred search results. For example, the information retrieval system 800 may determine that a predetermined number of search requesters associated with the identified feature (e.g., feature 860) submitted a similar search query (e.g., "football") and have shown a preference for a particular type of search result (e.g., results pertaining to Association football or soccer). Information reflective of this preference (e.g., metrics) may be stored (e.g., in data store 806) for retrieving by server 804 for use by one or more software modules (e.g., the feature modifier 658, shown in FIG. 6) for adjusting search result rankings. As shown by process arrows 822 and 846, adjusted search results may be sent to the client side system 810d and presented to the user via the results interface 818d. In this example, the ranking of the search results 816d may be adjusted such that results pertaining to Association football (soccer) are accentuated and the ranking of results pertaining to other types of football are generally decreased or suppressed.

An electronic document (which for brevity will simply be referred to as a document) may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining a user feature based on one or more query terms indicative of a particular feature that occur in a search query submitted during a search session;
   selecting a user group for the search session, of a plurality of user groups, wherein the user group is selected based on the determined user feature;
   obtaining a plurality of search results responsive to a second query submitted during the search session wherein each of the search results for the second query has a respective score indicating a quality measure of the result for the second query;
   determining that for one or more search results in the plurality of search results users associated with the selected user group select the one or more search results more often or less often than a general population of users that is larger than a number of users associated with the user group;
   based on the determining, modifying the respective score for each of one or more search results of the plurality of search results to create a modified plurality of search results, wherein the score for each of the one or more search results is modified based on, at least, the determination of how often the users associated with the selected user group select the search result relative to the general population; and
   providing the modified plurality of search results in response to the second query, wherein the modified plurality of search results has an order for presentation based on the respective scores and modified scores for the modified plurality of search results.

2. The method of claim 1 wherein determining a user feature based on one or more query terms further comprises identifying a spelling convention of one or more of the query terms.

3. The method of claim 1 wherein the user group represents a plurality of websites.

4. The method of claim 3 wherein selecting the user group further comprises determining that a number of search results selected during the search session are from the plurality of websites.

5. The method of claim 1 wherein the search session is defined by: a period of time, a number of submitted queries, or by a period of time between successive submitted queries.

6. The method of claim 1 wherein the user group represents a demographic characteristic of a user associated with the search session.

7. A system comprising:
   data processing apparatus programmed to perform operations comprising:
   determining a user feature based on one or more query terms indicative of a particular feature profession that occur in a search query submitted during a search session;
   selecting a user group for the search session, of a plurality of user groups, wherein the user group is selected based on the determined user feature;
   obtaining a plurality of search results responsive to a second query submitted during the search session wherein each of the search results for the second query has a respective score indicating a quality measure of the result for the second query
   determining that for one or more search results in the plurality of search results users associated with the selected user group select the one or more search results more often or less often than a general population of users that is larger than a number of users associated with the user group;
   based on the determining, modifying the respective score for each of one or more search result of the plurality of search results to create a modified plurality of search results, wherein the score for each of the one or more search results is modified based on, at least, the determination of how often the users associated with the selected user group select the search result relative to the general population; and
   providing the modified plurality of search results in response to the second query, wherein the modified plurality of search results has an order for presentation based on the respective scores and modified scores for the modified plurality of search results.

8. The system of claim 7 wherein determining a user feature based on one or more query terms further comprises identifying a spelling convention of one or more of the query terms.

9. The system of claim 7 wherein the user group represents a plurality of websites.

10. The system of claim 9 wherein selecting the user group further comprises determining that a number of search results selected during the search session are from the plurality of websites.

11. The system of claim 7 wherein the search session is defined by: a period of time, a number of submitted queries, or by a period of time between successive submitted queries.

12. The system of claim 7 wherein the user group represents a demographic characteristic of a user associated with the search session.

13. A computer program product stored on a non-transitory computer-readable medium comprising instructions that, when executed by data processing apparatus, cause the data processing apparatus to perform operations comprising:
   determining a user feature based on one or more query terms indicative of a particular feature that occur in a search query submitted during a search session;
   selecting a user group for the search session, of a plurality of user groups, wherein the user group is selected based on the determined user feature;
   obtaining a plurality of search results responsive to a second query submitted during the search session wherein each of the search results for the second query has a respective score indicating a quality measure of the result for the second query;
   determining that for one or more search results in the plurality of search results users associated with the user group select the one or more search results more often or less often than a general population of users that is larger than a number of users associated with the user group;

based on the determining, modifying the respective score for each of one or more search result of the plurality of search results to create a modified plurality of search results, wherein the score for each of the one or more search results is modified based on, at least, the determination of how often the users associated with the selected the user group select the search result relative to the general population; and providing the modified plurality of search results in response to the second query, wherein the modified plurality of search results has an order for presentation based on the respective scores and modified scores for the modified plurality of search results.

14. The program product of claim 13 wherein determining a user feature based on one or more query terms further comprises identifying a spelling convention of one or more of the query terms.

15. The program product of claim 13 wherein the user group represents a plurality of websites.

16. The program product of claim 15 wherein selecting the user group further comprises determining that a number of search results selected during the search session are from the plurality of websites.

17. The program product of claim 13 wherein the search session is defined by: a period of time, a number of submitted queries, or by a period of time between successive submitted queries.

18. The program product of claim 13 wherein the user group represents a demographic characteristic of a user associated with the search session.

* * * * *